(12) United States Patent
Christopher, Jr.

(10) Patent No.: US 7,624,394 B1
(45) Date of Patent: Nov. 24, 2009

(54) SOFTWARE INSTALLATION VERIFICATION

(75) Inventor: Greg Christopher, Jr., Boulder Creek, CA (US)

(73) Assignee: Adobe Systems Incorporation, San Jose, CA (US)

( * ) Notice: Subject to any disclaimer, the term of this patent is extended or adjusted under 35 U.S.C. 154(b) by 394 days.

(21) Appl. No.: 10/716,916

(22) Filed: Nov. 18, 2003

(51) Int. Cl.
*G06F 9/445* (2006.01)
(52) U.S. Cl. .......................... 717/177; 717/174
(58) Field of Classification Search ............ 717/126, 717/168–178
See application file for complete search history.

(56) References Cited

U.S. PATENT DOCUMENTS

| | | | | |
|---|---|---|---|---|
| 6,041,360 | A * | 3/2000 | Himmel et al. | 709/245 |
| 6,071,316 | A * | 6/2000 | Goossen et al. | 717/126 |
| 6,216,175 | B1 * | 4/2001 | Sliger et al. | 717/169 |
| 6,535,915 | B1 * | 3/2003 | Valys et al. | 709/222 |
| 6,560,776 | B1 * | 5/2003 | Breggin et al. | 717/126 |
| 6,738,970 | B1 * | 5/2004 | Kruger et al. | 717/175 |
| 6,751,795 | B1 * | 6/2004 | Nakamura | 717/174 |
| 6,944,858 | B2 * | 9/2005 | Luu | 717/174 |
| 6,957,437 | B1 * | 10/2005 | Bogia et al. | 719/327 |
| 6,978,454 | B2 * | 12/2005 | Singleton | 717/175 |
| 7,028,019 | B2 * | 4/2006 | McMillan et al. | 707/1 |
| 7,047,522 | B1 * | 5/2006 | Dixon et al. | 717/131 |
| 7,093,247 | B2 * | 8/2006 | Ashworth et al. | 717/174 |
| 2002/0156831 | A1 * | 10/2002 | Suorsa et al. | 709/202 |
| 2003/0046679 | A1 * | 3/2003 | Singleton | 717/175 |
| 2003/0051235 | A1 * | 3/2003 | Simpson | 717/174 |
| 2003/0192033 | A1 * | 10/2003 | Gartside et al. | 717/126 |
| 2004/0044996 | A1 * | 3/2004 | Atallah | 717/169 |
| 2004/0078783 | A1 * | 4/2004 | Matsushima | 717/126 |
| 2004/0243995 | A1 * | 12/2004 | Sheehy | 717/174 |
| 2005/0033977 | A1 * | 2/2005 | Zurita et al. | 713/200 |
| 2006/0075399 | A1 * | 4/2006 | Loh et al. | 717/174 |

OTHER PUBLICATIONS

Muller, Nathan J., "Focus on OpenView: A Guide to Hewlett Packard's Network and Systems Management Platform," 1995, CBM Books, pp. 179-185 and 210-211.*

* cited by examiner

*Primary Examiner*—Qing Chen
(74) *Attorney, Agent, or Firm*—Fish & Richardson P.C.

(57) ABSTRACT

Systems and techniques to verify software installation. In general, in one implementation, the technique includes: creating data that represents a new expectation for an installation result, for one or more resources associated with a software installer, the new expectation being a transition from an expectation of volatility to an expectation of stability for future software installs. A comparison of a current software installation with a previous software installation can be generated, and based on the comparison, resources that change in their installation result from the previous software installation to the current software installation, despite an expectation of stability for the resources, can be identified, and resources that have not changed in their installation result from the previous software installation to the current software installation, despite an expectation that the unchanged resources should change from the previous software installation to the current software installation, can also be identified.

23 Claims, 10 Drawing Sheets

FIG. 6

Adobe Installer Automation System - Home - [Viewing All Test Results]

http://alts.corp.adobe.com/cgi-bin/acrobatqe/Home?sort_by=s_platform&cache_view=1&Home-1

Adobe Installer Automation System:  Username: gchristo  Account: admin   Help  Home  Log-Out

| | | | | | | |
|---|---|---|---|---|---|---|
| win2000 | acrobase | dut | dds | full | Test completed successfully for build created on Tue Jun 24 02:55:02 2003 | No Baselines Yet |
| win2000 | acrobase | dut | dds | typical | Test completed successfully for build created on Tue Jun 24 02:55:02 2003 | No Baselines Yet |
| win2000 | acrobase | nor | dds | full | Test completed successfully for build created on Tue Jun 17 13:10:59 2003 | No Baselines Yet |
| win2000 | acrobase | nor | dds | typical | Test completed successfully for build created on Tue Jun 17 13:10:59 2003 | No Baselines Yet |
| win2000 | acrobase | swe | dds | full | Test completed successfully for build created on Tue Jun 24 02:55:02 2003 | No Baselines Yet |
| win2000 | acrobase | swe | efg | typical | Test completed successfully for build created on Tue Jun 24 02:55:02 2003 | No Baselines Yet |
| win2000 | acrobase | enu | efg | tuner1 | Test completed successfully for build created on Tue May 6 18:35:32 2003 | No Baselines Yet |
| win2000 | acrobase | enu | efg | tuner2 | Failed Test - VMWare image not found - Tue May 6 18:35:32 2003 - 1 Related Files No previous successful tests | No Baselines Yet |
| win2000 | acrobase | fre | efg | tuner1 | Failed Test - Could not contact machine via SOAP - Tue May 6 18:35:32 2003 - 1 Related Files No previous successful tests | No Baselines Yet |
| win2000 | acrobase | fre | efg | tuner2 | Failed Test - VMWare image not found - Tue May 6 18:35:32 2003 - 1 Related Files No previous successful tests | No Baselines Yet |
| win2000 | acrobase | ger | efg | tuner1 | Test completed successfully for build created on Thu Jul 31 14:09:48 2003 | No Baselines Yet |
| win2000 | acrobase | ger | efg | tuner2 | Failed Test - VMWare image not found - Tue May 6 18:35:32 2003 - 1 Related Files No previous successful tests | No Baselines Yet |
| win2000 | acrobase | enu | enu | full | Test completed successfully for build created on Thu Jul 31 14:09:48 2003 | No Baselines Yet |
| win2000 | acrobase | enu | enu | typical | Test completed successfully for build created on Thu Jul 31 14:09:48 2003 | No Baselines Yet |
| win2000 | acrobase | jpn | jpn | full | Test completed successfully for build created on Thu May 22 11:48:47 2003 | View Baselines |
| win2000 | acrobase | jpn | jpn | typical | Test completed successfully for build created on Thu May 22 11:48:47 2003 | View Baselines |
| win2000 | acrobase | fin | nf | full | Test completed successfully for build created on Tue Jun 24 00:38:34 2003 | No Baselines Yet |

Adobe Installed Automation System - Result Summary - win2000 rdrbig fin (fin) typical http://ats.corp.adobe.com/cgi-bin/acrobatqe/ResultSummary?objid-12563

Rendezvous Apple Amazons eBay Yahoo! News

Adobe installer Automation System: Username: gchristo Account: admin

Help Home Log-Out

Result Summary win2000 rdrbig fin (fin) typical Installation

Build Statistics for Tue Jun 24 02:16:58 2003

General Statistics

| Build Date | Test Start Date | Test End Date | Total Time |
|---|---|---|---|
| Tue Jun 24 02:16:58 2003 | Tue Jun 24 10:17:29 2003 | Tue Jun 24 10:47:12 2003 | 29.72 minutes |

Filesystem (350 Baseline Entries)

| Desired | Anomalies | Filtered | Log Files |
|---|---|---|---|
| 350 | 0 | 74 | 7 Files |

Registry (1074 Baseline Entries)

| Desired | Anomalies | Filtered |
|---|---|---|
| 1074 | 0 | 0 |

Adobe Installed Automation System -Result Details - win2000 rdrbig fin (fin) typical - Desired http://aiits.corp.adobe.com/cgi-bin/acrobatqe/ResultDetails?type-fdumphash&objid-15465&category-anom Rendezvous  Apple  Amazons  eBay  Yahoo!  News Adobe installer Automation System:   Username: gchristo   Account: admin                                Help  Home  Log-Out

Result Details win2000 rdrbig fin (fin) typical Installation - Desired

Build Date: for Thu Jul 24 13:45:13 2003 - Desired | Anomalies | Filtered | Return to summary | View logs Add Feature [    ] go

| Entry Name and Path | Discrepancies | Installer Action | Select All |
|---|---|---|---|
| | | | ● Do Nothing  ○ Bless  ○ Remove from Baseline  ○ Filter |
| | | | ○ Rebless  ○ Revert  ○ Remove From Filter |
| C:\ Documents and Settings\All Users,WINDOWS \ Application Data \ Adobe \ | | | |
| Parent Path MORE INFO | no changes | installed | ● Do Nothing  ○ Remove from Baseline  ○ Filter |
| C:\ Documents and Settings\All Users,WINDOWS \ Application Data \ Adobe \ Acrobat \ | | | |
| Parent Path MORE INFO | no changes | installed | ● Do Nothing  ○ Remove from Baseline  ○ Filter |
| C:\ Documents and Settings\All Users,WINDOWS \ Application Data \ Adobe \ Acrobat \ 6.0 \ | | | |
| Parent Path MORE INFO | no changes | installed | ● Do Nothing  ○ Remove from Baseline  ○ Filter |
| C:\ Documents and Settings\All Users,WINDOWS \ Application Data \ Adobe \ Acrobat \ 6.0 \ Replicate \ | | | |
| Parent Path MORE INFO | no changes | installed | ● Do Nothing  ○ Remove from Baseline  ○ Filter |
| C:\ Documents and Settings\All Users\WINDOWS \ Application Data \ Adobe \ Acrobat \ 6.0 \ Replicate \ Security \ | | | |

SOFTWARE INSTALLATION VERIFICATION

BACKGROUND OF THE INVENTION

The present disclosure describes systems and techniques relating to installation of software on computing systems, for example, software installer verification during software product development.

Over the course of a software product's development life-cycle, the resources needed to correctly install the product can change regularly, often on a daily basis. Resources that often change include the program's executable code, help files, readme and license files, system code, system registry entries, and components installed into other software products to allow for feature integration. For example, in Windows® systems for personal computers, provided by Microsoft Corporation of Redmond, Wash., registry entries that are added or modified by a software product installer frequently change on a daily basis during development of the product.

Moreover, for each logical resource in the software product, there can be multiple actual resources that are provided for various installation options available with the product. Each operating system (OS) can have slightly different locations for system components, even within the same OS family, such as in Windows® systems. When a software product is created for multiple languages (e.g., English and French), a single logical resource, such as a help file on a particular topic, can have multiple different files and names available for installation for the different language versions of the product. The variety of installation combinations can multiply by a power of two for each different custom install option.

Current installation monitoring products can be used to track system changes in order to identify what is installed by a software installer, or to facilitate cleanly uninstalling a software product. Such installation monitoring products can also be used to identify all the components of a current software installation result that are different than the components of a previous software installation result. Additionally, MICROSOFT's Installer technology drives the creation of installers from a database, which can be exported into MICROSOFT Access and used later to verify that the entries are all installed on a system.

SUMMARY OF THE INVENTION

In general, in one aspect, the invention features operations including generating a comparison of a current software installation with a previous software installation, and identifying, based on the comparison, resources that have not changed in their installation result from the previous software installation to the current software installation, despite an expectation that the unchanged resources should change from the previous software installation to the current software installation. The operations can further include identifying, based on the comparison, resources that have changed in their installation result from the previous software installation to the current software installation, despite an expectation that the changed resources should not change from the previous software installation to the current software installation. Moreover, the operations can include receiving input specifying which of the identified resources should be static in their installation result for future software installations, and designating a new expectation of stability for the specified resources according to the received input.

Potential problems with the current software installation can be presented based on the identified resources to facilitate verification of an installer for a software product, which can be a new product or an upgrade to an existing product. The expectations of resource changes can be tracked in a primary installation baseline and a secondary installation baseline. Presenting the potential problems can involve presenting a baseline-update interface by transmitting markup language data. Additionally, a set of resources can be excluded from the generated comparison for the software product.

The expectations of resource changes can be stored in a relational database indexed, by date, platform, language, and product configuration. The expectations of resource changes can relate to attributes including modification date stamp information, file size information, security permissions information, and checksum information. The resources can include files and system registry entries, and the installation result can include deletions, additions and modifications of the resources.

According to another aspect, a system includes a build controller, an install controller, and one or more install slave machines. The install controller includes a database having a baseline that records expectations of stability or volatility for one or more resources associated with a software installer. The build controller automatically triggers the install controller to initiate installer tests as part of a software build process, and the install controller automatically dispatches installation to the one or more install slave machines and collects test results to be presented in a report including a baseline-update interface. The install controller can communicate with the one or more install slave machines using Simple Object Access Protocol. The baseline-update interface can be a web-based user interface that allows baseline updates across product stock keeping, unit (SKU), language, operating system and custom/non-custom installs, in combination or all at once.

The invention can be implemented to realize one or more of the following advantages. A change-tracking system using the systems and techniques described can be used to verify correct installation of a software product with many resources that are being changed frequently (e.g., daily). Change tracking can be efficiently performed across multiple versions of the software product, such as those created for different operating systems, human languages, and custom install options. A system employing the present techniques can track what should actually be installed on a particular day in a software product's life-cycle, including components that need to be installed in other applications' directories, and quickly call attention to inadvertently introduced errors. This can be of particular value in the latter part of a software product's development life-cycle, when engineers may be struggling to meet a set product release date.

Valid behavior changes in the product installers can be easily tracked and maintained, such as by using a relational database to record expected installation results, and a web-based application can be used to present potential problems and accept updates to the recorded expectations as the product changes. The described techniques are scalable, allowing tests on many different combinations of product-platform installs to be automatically performed and potential problems reported in a manner that minimizes the information presented to test reviewers. By tracking the nature of installation changes over time, software installation verification can be simplified.

The advantages of a system using the present techniques to facilitate verification of an installer for a software product under development can be especially important as the product's changes slow to a stop as a release date nears. At this point in time, most resources have expectations of stability, and the date, size, checksum, and permission attributes of installed files are very close to what is desired in the final product. Because an exact attribute identity for each file that has stabilized can be provided, each file can be easily verified as installed correctly, byte-for-byte and attribute-for-attribute. Hundreds of installations can be performed and verified in the space of time it might otherwise take to verify a single combination.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 6-11 illustrate example user interfaces in a network application that can be used in the systems of FIGS. 4 and 5.

Like reference symbols in the various drawings indicate like elements.

DETAILED DESCRIPTION

Figure 1:
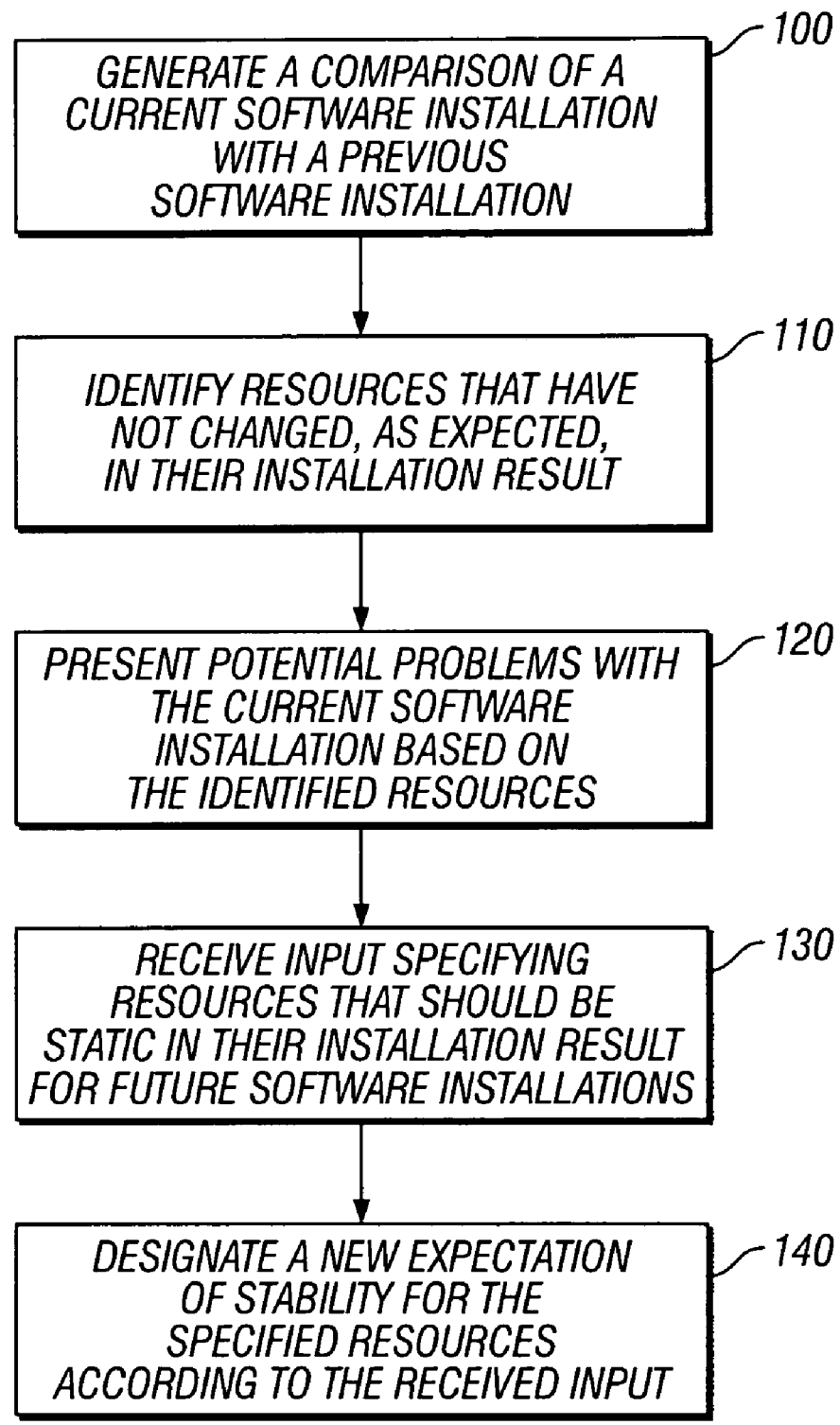
FIG. 1 is a flowchart illustrating software installation verification.

FIG. 1 is a flowchart illustrating software installation verification. A comparison of a current software installation with a previous software installation is generated at 100. This comparison can be performed at different levels of granularity. For example, this comparison can be performed such that all modifications to a computing system (e.g., additions, deletions and modifications of files and system registry entries) caused by a software install are taken into consideration during the comparison. Moreover, the software installations can be new installations of a software product (e.g., tests of a shrink wrapped software product during development) or upgrade installations of an existing software product (e.g., tests of a software upgrade to an enterprise system).

Figure 2:
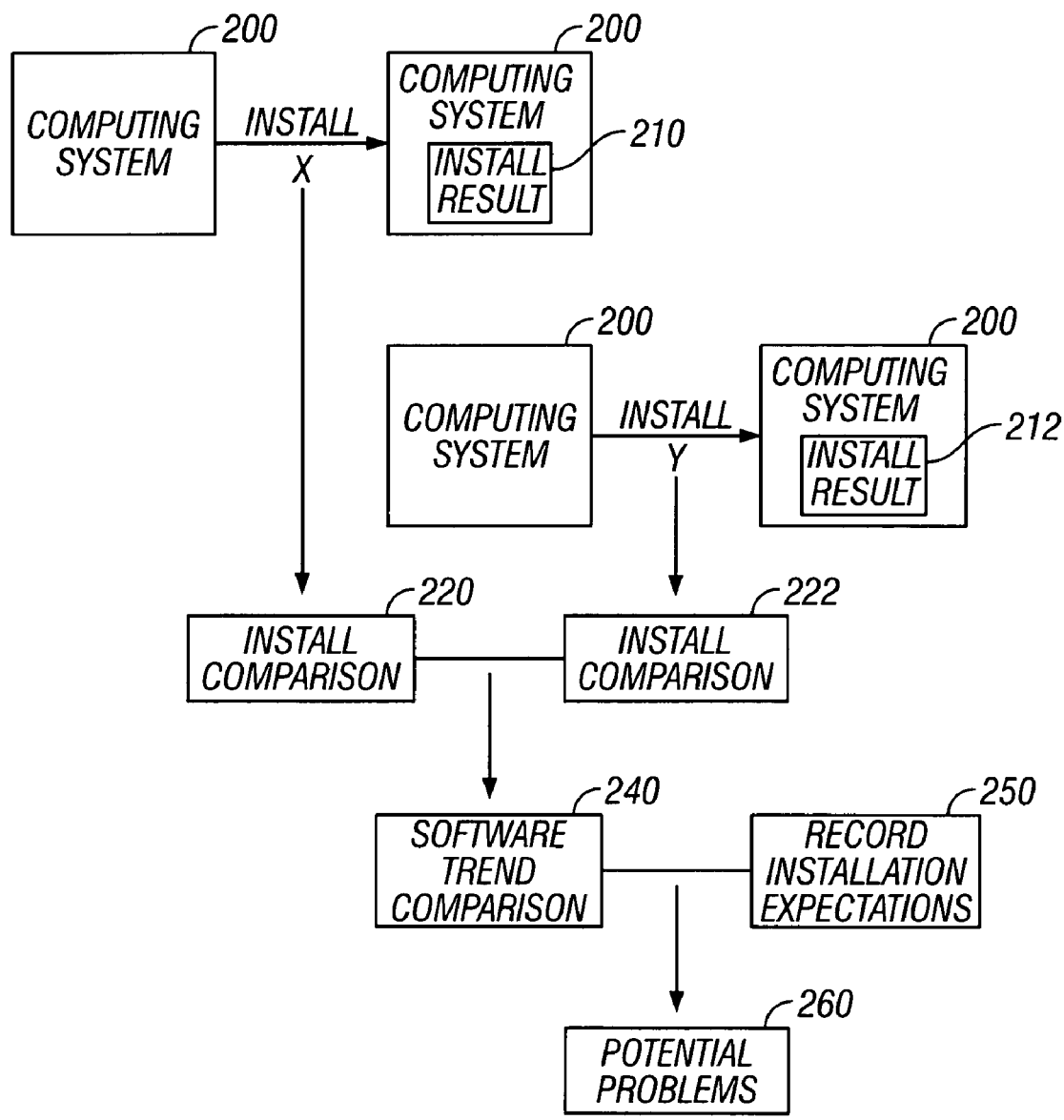
FIG. 2 is a block diagram illustrating software installation verification.

Resources that have not changed in their installation result as expected are identified at 110. The expected results represent expected differences in a computing system as opposed to observed differences in a computing system. Moreover, the expected results can represent expected differences in a computing system as caused by two separate install operations. FIG. 2 illustrates this in a block diagram format. A computing system 200 is a platform used for testing installation of a software product. The system 200 can be any programmable machine or distributed computing system, which can be operated using any operating system (OS) and/or networking protocol(s).

Before each install, the computing system 200 can be a clean system, meaning the system 200 either does not have the software product being tested already installed, or the system 200 has a previous release version of the software product (i.e., when the techniques described here are used to verify a product update install for a new version of an existing software product). After an install X is performed, the system 200 has an install result 210, and an install comparison 220 can be obtained to identify and record the install result 210. The install comparison 220 represents observed differences in the system 200 caused by install X. The system 200 can then be cleaned, and a later install Y can be performed using a newer version of the software product. Install Y generates a new install result 212. A new install comparison 222 can be obtained to identify and record the install result 212. The install comparison 222 represents observed differences in the system 200 caused by install Y.

The two install comparisons 220, 222 can then be compared to generate a software trend comparison 240, which represents observed differences in the installation results caused by the two test installs of the software product. A record of installation expectations 250 can be used to hold the expected results discussed above in connection with FIG. 1. This record of installation expectations 250 can be compared with the software trend comparison 240, and potential problems 260 with the software installation can be presented based on this comparison. Thus, changes to software installations can be tracked using a two-stage differencing scheme. The first stage can find the differences between a clean system and an installed system (e.g., deletions, additions, and changes to the file system and any system registry), and the second stage can find differences between results in the first stage over multiple install tests of a changing software product.

Referring again to FIG. 1, potential problems with the current software installation can be presented, at 120, based on the resources identified as not changing in their installation results as expected. The expected results can include expectations of change in a resource's installation result (i.e., the resource is expected to be in flux from one install test to the next), and the expected results can also include expectations of no change in a resource's installation result (i.e., the resource is expected to be stable from one install test to the next). Moreover, the expected results can include both types of expectations for different aspects of a single resource's installation result. For example, a first attribute of a resource's installation result can be expected to change, while at the same time, a second attribute of the resource's installation results is expected to not change from one install to the next.

The expected result for an install can be obtained and defined in different manners depending on the needs of a particular system in which the present techniques are used. In general, unexpected changes or unexpected lack of changes caused by an install are presented to a system, process and/or person. Input specifying one or more of the identified resources that should be static in their installation result for future software installations can be received at 130. A new expectation of stability for the specified resources can be designated according to the received input at 140. As mentioned previously, and as discussed in more detail below, this new expectation of stability can be applied to the resource as a whole or to a single aspect of the resource (e.g., leaving other aspects of the resource in an expected state of flux). Additionally, input of a converse nature can be received and acted upon as well (e.g., input specifying an aspect of a resource to be designated as volatile for future installs, thereby changing a current expectation of stability for that aspect of the resource).

Figure 3:
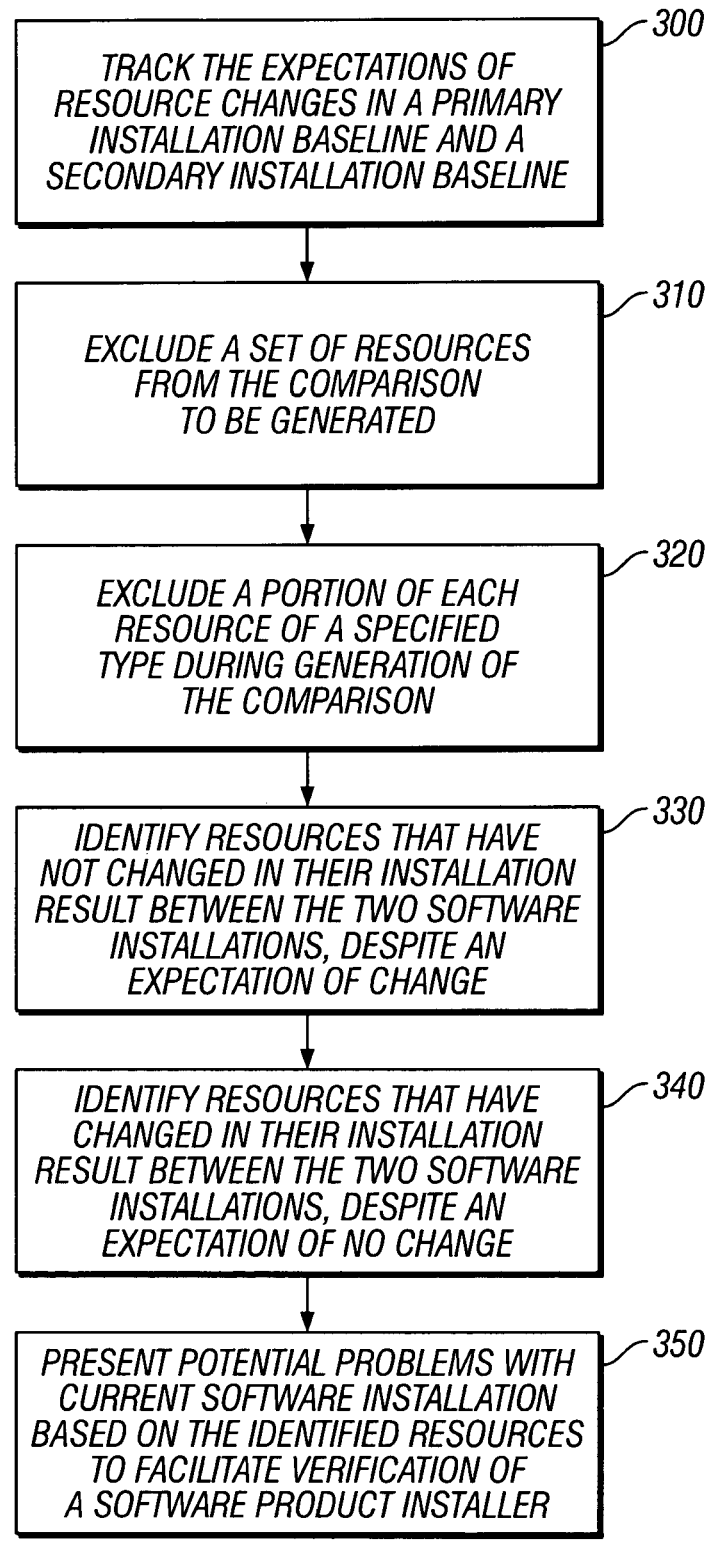
FIG. 3 is a flowchart illustrating software installation verification used during software product development.

FIG. 3 is a flowchart illustrating software installation verification used during software product development. During the development of a software product, the resources needed to correctly install the product can change regularly, often on a daily basis. But typically, as the software product gets closer to release, the number of changing resources declines, and thus the results of installation of the product become more stable over time. The systems and techniques described herein can be used to understand how the installations of a developing software product change over the product life-cycle, and to quickly identify errors in the product and/or its installer(s), particularly errors that are introduced in the latter part of the development process.

Expectations of resource changes can be tracked in a primary installation baseline and a secondary installation baseline at 300. In general, the primary baseline represents what is added to and modified in a computing system during a product installation and can represent what should be installed; the secondary baseline represents how installed resources are changing (i.e., if they are changing or not changing in one or more attributes) from one product-version installation to the next. A set of resources can be excluded, at 310, from the software installation comparison to be generated. Many software product installers generate results in certain areas of a computing system that nearly always change from one install to the next, regardless of the state of development of the software product. For example, temporary files are commonly created every time a software product is installed, and these temporary files can be highly dependent on small changes in an install process. Thus, noisy areas of the installation, such as a temp file directory and register entries in a particular area, or other areas of the installation that are not of interest to a user, can be filtered from the installation comparisons.

Additionally, a portion of each resource of a specified type can be excluded during generation of the comparison at 320. Some resources can include a portion that does change from one install to the next, despite the fact that the resource can otherwise be considered stable. For example, executable files frequently include an embedded date stamp. In the case where multiple attributes are tracked for each resource, including a checksum, executable files can have their embedded date stamps removed before the checksum is taken.

Resources that have not changed in their installation result between the two software installations, despite an expectation of change, are identified at 330. Resources that have changed in their installation results between the two software installations, despite an expectation of no change, are identified at 350. Then, potential problems with the current software installation can be presented, at 350, based on the identified resources to facilitate verification of a software product installer.

Figure 4:
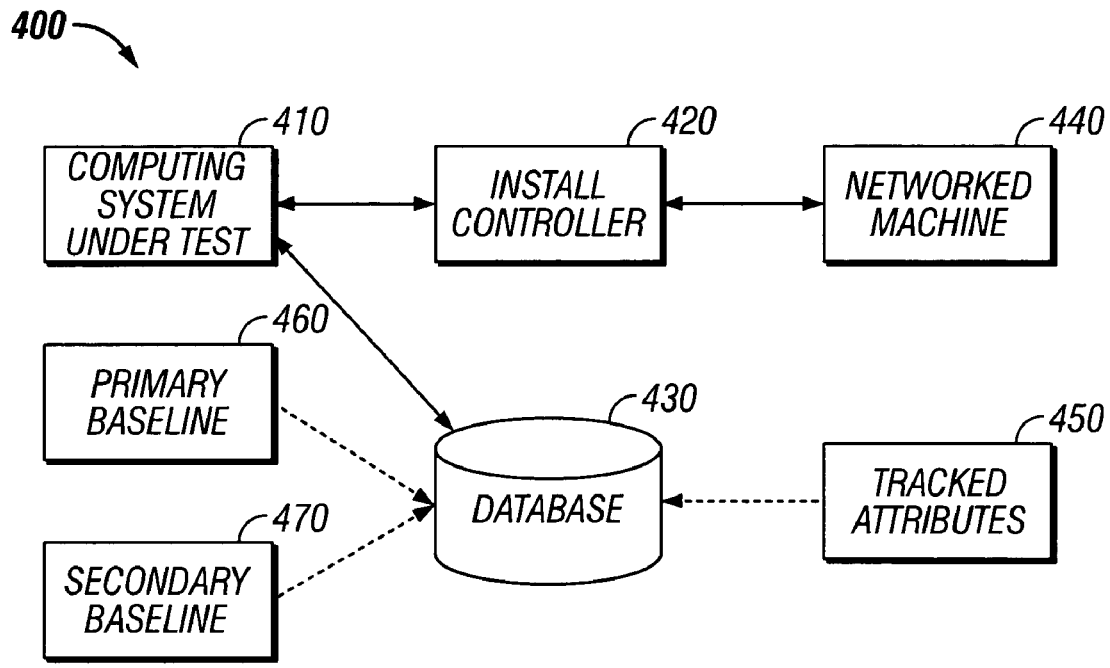
FIG. 4 is a block diagram illustrating a system that can be used to perform software installation verification.

FIG. 4 is a block diagram illustrating a system 400 that can be used to perform software installation verification. The system 400 includes a computing system 410 being used as a test platform, such as described above. An install controller 420 manages the install testing process using the techniques described above and a database 430. The install controller 420 and/or the system under test 410 can communicate results to the database 430. Conceptually, the controller purely controls the automatic testing; the database and web server machine can be run separately from the controller machine to optimize performance.

By using a separate machine to control installations, problems can be noticed and handled. The expectations of resource changes can be stored in the database 430, which can be a relational database indexed by date, platform, language, and product configuration. The product configuration index can also be broken out into multiple indices, such as a product version index (e.g., different versions of the same software product that correspond to different operating systems and/or different functional grades of the product) and an installation options index (e.g., different installed versions of the software product resulting from different selection of installation options). This use of the database 430 facilitates tracking separate but related differences for many different combinations of the installation resources.

The expectations of resource changes can be stored in the database 430 as a baseline, which represents the currently desired results for an installation of the software. As mentioned above, the baseline can be divided (either literally or conceptually) into a primary baseline 460 and a secondary baseline 470. The primary baseline 460 records what is actually added to and modified in the computing system 410, and can represent what should be installed in the form of additions, deletions and modification to the file system. The secondary baseline 470 records how installed resources are changing (i.e., if they are changing or not changing in one or more attributes) from one product build to the next. Installed resources that are tracked can include executable code, help files, readme files, license files, system code, system registry entries, and components installed into other software products and/or the OS to allow for feature integration. For example, in Windows® based systems, registry entries can be tracked such that changes to the registry entries are monitored with each new install test. The primary baseline 460 and secondary baseline 470 can each be maintained in the database 430 in their own separate tables. Moreover, when registry entries are tracked, such as in Windows® systems where a parallel registry database exists whenever a file database is mentioned, the registry entries can be separately tracked resources that also have permissions and data associated with them. Because the baselines can be indexed by language, operating system, and product configuration, many different baselines can be easily maintained in a single database.

The baselines can be created automatically on the first install using the system 400. For example, the primary baseline 460 can be set equal to the results of the system comparison during a first test install, and the secondary baseline 470 can be set to indicate that all resources are initially presumed to be changing with each new install test in all attributes across all testing indices. When the second test install is performed, a reviewer of the change-tracking report, which is described in detail below, can update the secondary baseline 470 to indicate which resources should be stable, and which resources should be in flux going forward. This review can also be performed after each subsequent test install of a new version of the software product, or just periodically during the development life-cycle of the product.

The baselines can keep track of resource installation results using multiple tracked attributes 450. These tracked attributes can include, for each resource-specific installation result, an identifier (e.g., a name of an installed file), placement information (e.g., a directory path where a file is installed), modification date stamp information, file size information, security permissions information, and/or checksum information (e.g., an MD5 (Message-Digest algorithm 5) thumbprint).

After each product install test, which can in practice represent multiple tests of various installs of the same software product (e.g., tests of various available product configurations using multiple platforms and multiple languages), the install controller 420 can inform appropriate individuals (e.g., by causing an email to be sent to the appropriate individuals) that the installation comparison testing has completed. Additionally, the install controller 420 can generate and deliver a report to a network application running on a networked machine 440. For example, the install controller 420 can use a web server to generate and transmit the report to the network application, which can be a web-based application, such as a standard web browser. The report can be transmitted to the networked machine 440 over a machine network in the form markup language data (e.g., Hypertext Markup Language (HTML) and/or Extensible Markup Language (XML)). Moreover, the transmitted report can use security protections, such as encryption and user authentication, to ensure that only the appropriate individuals are reviewing generated reports and updating the baselines.

If the nature of the way in which resources are changing reverses direction (e.g., from changing to not changing), this can be flagged in the report. When a file that was modified previously does not get modified, and when a file that was not modified previously does get modified, these events can be noted as a difference in the report, including at an attribute level of granularity. For example, any attributes that were not changing in the approved secondary baseline 470, but that are changing now can be flagged in the report. This may represent the wrong version of a file being installed to a tester. Any attributes that were changing previously, but remained the same between the current installers and the previous installers can be flagged in the report. This may also represent the wrong version of a file being installed to a tester, but in that case might mean that the previous build's file was accidentally installed in the current installation. Additionally, if a file that was installed previously didn't get installed in the current test, this shows up as a deletion and can be noted in the report; and if a file that as not installed previously does get installed in the current test, this shows up as an addition and can be noted in the report.

Moreover, the report can include a baseline-update user interface that allows the baseline to be changed using the network application on the networked machine 440. Changes made to the baseline using this interface can optionally be applied, in any combination, cross-product-configuration, cross-platform and cross-language by a development team. After the latest results have been examined, approved, and adjusted as necessary, the following operation can be performed automatically: for all first-level difference entries that had a valid match against the primary baseline list of modifications, the resource attributes are updated in the baseline database. This can be done so that the second-level difference performed next has the latest valid attribute stamp for each resource entry to compare against.

Figure 5:
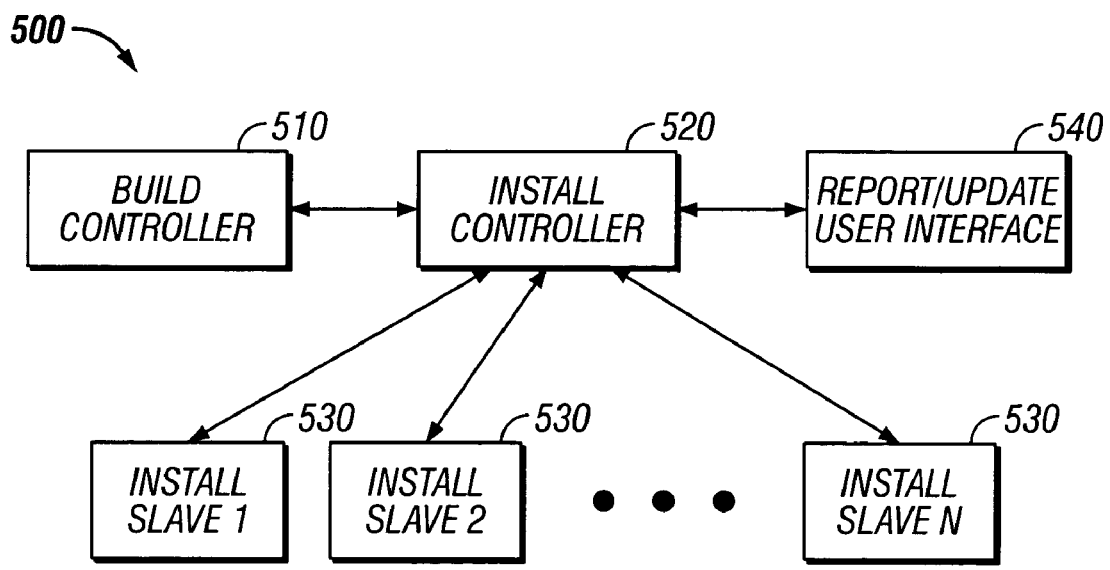
FIG. 5 is a block diagram illustrating a readily scalable change-tracking system that can be used during software product development to verify software installers for a software product during the development process.

FIG. 5 is a block diagram illustrating a readily scalable change-tracking system 500 that can be used during software product development to verify software installers for a software product during the development process. The system 500 includes a build controller 510, which handles creation of a full build of the software product for a particular day's testing. An install controller 520 functions as described above and can include a SQL (Structured Query Language) database, a SOAP (Simple Object Access Protocol) client/server, and web server core logic. The SQL database can be used to maintain baselines and daily installation records indexed by date, language, OS, product SKU, and custom/non-custom install. The build controller 510 communicates with the install controller 520 to trigger installer tests, and in response, the install controller 520 automatically obtains installers from the build controller 510. Thus, initiation of the installer tests becomes an automatic part of the software build process.

Multiple install slaves 530 can be used for the install testing. Each install slave 530 can be a personal computer or other computing system. The install controller 520 can automatically dispatch installation to the multiple slave machines 530. The install controller 520 can send commands, installers and data to the install slaves 530 using SOAP. Using SOAP as a transport for files and data provides a flexible, cross-platform way to get data to and from the slave machines 530. Each install slave 530 can be run through a repeating process of install, product launch, change identification, posting of install result information, and system cleaning for the next install test. The install controller 520 can send results of multiple installation tests to a network application on a regular (e.g., nightly) basis in the form of a report/update user interface 540. This user interface can allow baseline updates across product SKU, language, OS and custom/non-custom installs in combination or all at once. The install controller 520 can also receive back updates to the baselines maintained in its database. Moreover, the baseline comparisons can be measured against the last user access to the automatically generated reports. Thus, skipping a day of verifying the report does not mean the results of the next day's install tests are invalid.

A baseline-update report can list resources (e.g., files and registry entries) that (1) should have been installed but were not, (2) were installed but should not have been, (3) were modified but should not have been, and (4) were not modified but should have been. Following this information in the report can be a list of resources that stopped changing (in one or several attributes) that had been changing previously, and a list of resources that started changing (in one or several attributes) that were not changing previously. As mentioned above, the report can include a user interface that allows the baselines to be changed directly from the report. Moreover, the report can be in the form of a web page accessed using a standard web browser (e.g., the click of a button in the report can trigger a web-application script to execute to effect an update).

A checkbox can be made available next to each identified change that if checked means 'update this entry.' Once the report is reviewed, a single button can be clicked to submit the changes. A second page can appear, listing the changes about to be submitted. The user has a second chance to look over the changes and one more click on the report commits the changes to the baseline. Since baseline changes get new entries by date, it is easy to back out of erroneous changes in the event an error is made.

Figure 6:
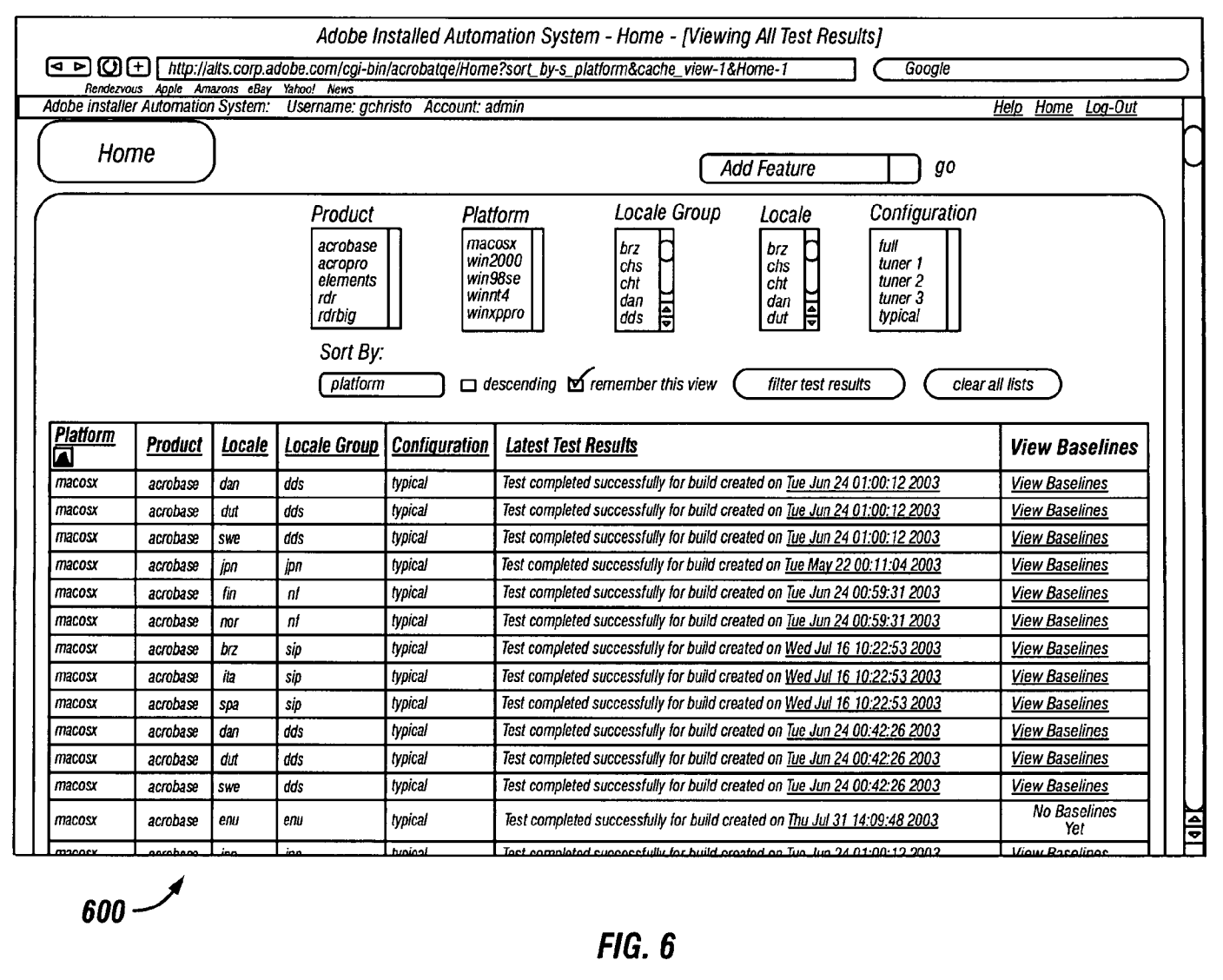

FIGS. 6-11 illustrate example user interfaces in a network application that can be used in the systems of FIGS. 4 and 5. FIG. 6 shows a controller test results page 600. As shown, tests can be filtered and sorted by product being tested, operating system being run on, human language, and the style of install (for instance, custom vs; typical install). FIG. 7 shows a view of a summary page 700 that illustrates high level failures being brought to the user's attention. FIG. 8 shows a results page 800 for a single test, where the page 800 include links to "anomalies" (unexpected results) as well as "desired" results.

Figure 9:

FIG. 9 shows an anomaly report 900 created after the very first run of a test. Because no previous tests were run, there is no "expected result", and therefore, every single installation item shows as an anomaly. Radio buttons are presented on the right of the report 900 that allow a user to approve each item as an expected result. Also, there is an option to filter an item or a directory's items, which means that although the installation has resulted in this system change, the user is not concerned with it for the purposes of testing the installation. An example is a created temp file that will automatically get deleted by the system later. The nature of these files is such that they always get unique names and therefore need not be tracked. Filtering allows users to reduce the unwanted noise in the reporting.

Figure 11:
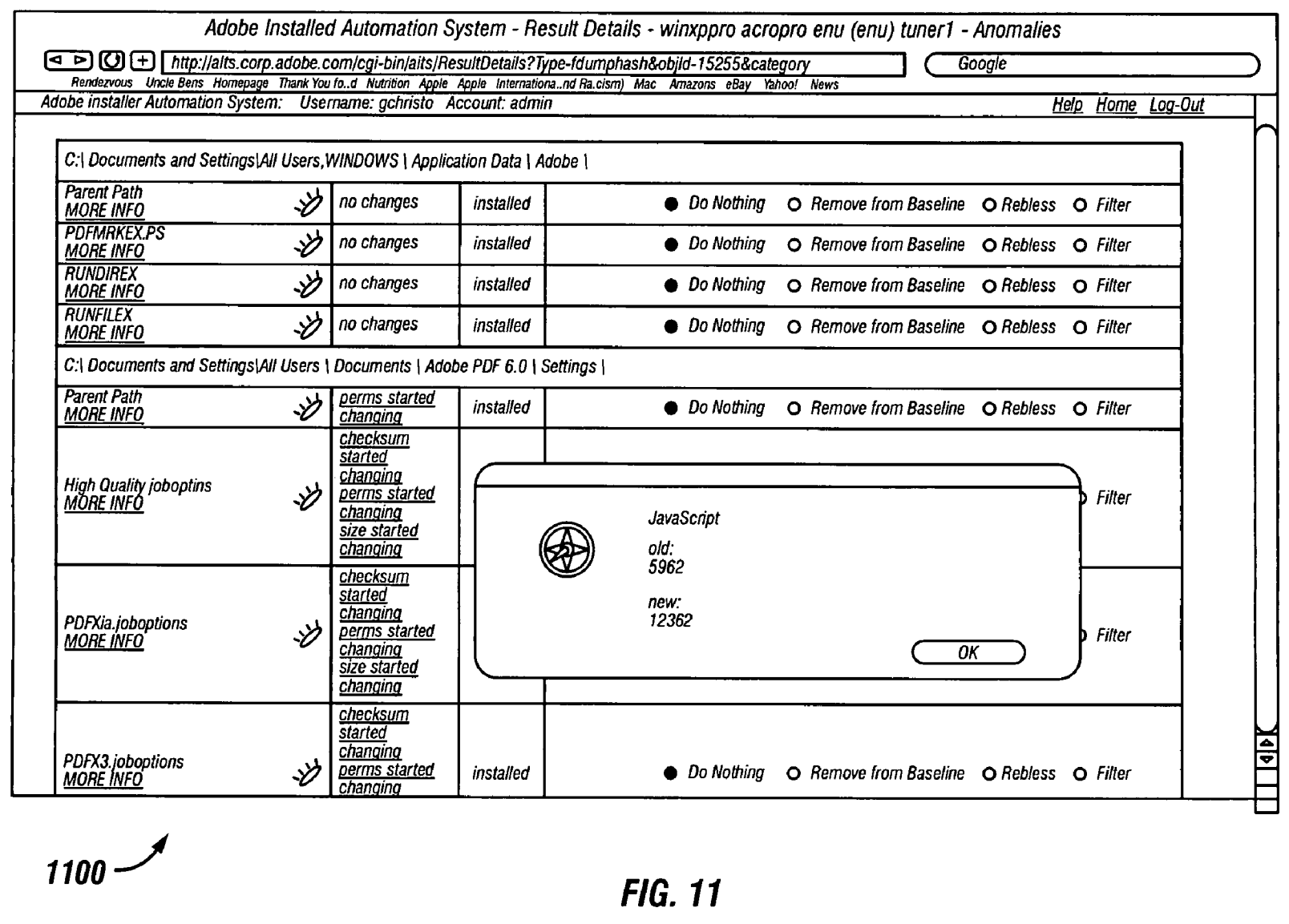

FIG. 10 shows a report 1000 that illustrates desired results. The halo on the left is an indicator that the files are approved by the user, i.e., "blessed" into the baseline. The report 1000 also provides an opportunity to remove these items from the approved baseline. FIG. 11 shows a report 1100 that illustrates calling attention to anomalies detected in certain resources. Clicking on a link shows the details.

The invention and all of the functional operations described in this specification can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following, claims. For example, the operations of the invention can be performed in a different order and still achieve desirable results. Multiple scripting languages, such as a combination of Perl and APPLESCRIPT languages, can be used to implement the invention; scripting languages can tend to be well suited to controlling software programs.

What is claimed is:

1. A machine-implemented method comprising:
    obtaining an install comparison of a current software installation to a target computer and an install comparison of a previous software installation to the same target computer in a series of two or more software installations during a software product development;
    generating a software trend comparison of the current software installation install comparison with the previous software installation install comparison;
    obtaining expected installation results for a resource including attributes including a dynamic attribute and a static attribute, the dynamic attribute is an attribute that should have changed between the previous software installation and the current software installation, the static attribute is an attribute that should remain unchanged between the previous software installation and the current software installation;
    comparing the expected installation results with the software trend comparison to identify whether the dynamic attribute was not changed in the current software installation and whether the static attribute was changed in the current software installation; and
    presenting potential problems with the current software installation, based on results of the comparing the expected installation results with the software trend comparison, to facilitate verification of an installer for the software product development.

2. The machine-implemented method of claim 1, further comprising tracking expectations for the resource in a primary installation baseline and a secondary installation baseline, and wherein presenting the potential problems comprises presenting a baseline-update interface by transmitting markup language data.

3. The machine-implemented method of claim 1, further comprising excluding a set of resources from the generated comparison for the software product development.

4. The machine-implemented method of claim 2, wherein expectations of resource changes, including the installation data, are stored in a relational database indexed by date, platform, language, and product configuration.

5. The machine-implemented method of claim 1, wherein the attributes comprising modification date stamp information, file size information, security permissions information, and checksum information.

6. The machine-implemented method of claim 1, wherein the resource comprises a file and a system registry, and the installation data comprises deletion, addition, and modification of the resource.

7. A software product tangibly embodied in a machine-readable storage device, the software product comprising instructions operable to cause one or more data processing apparatus to perform operations comprising:
    obtaining an install comparison of a current software installation to a target computer and an install comparison of a previous software installation to the same target computer in a series of two or more software installations during a software product development;
    generating a software trend comparison target of the current software installation install comparison with the previous software installation install comparison;
    obtaining expected installation results for a resource including attributes including a dynamic attribute and a static attribute, the dynamic attribute is an attribute that should have changed between the previous software installation and the current software installation, the static attribute is an attribute that should remain unchanged between the previous software installation and the current software installation;
    comparing the expected installation results with the software trend comparison to identify whether the dynamic attribute was not changed in the current software installation and whether the static attribute was changed in the current software installation; and presenting potential problems with the current software installation, based on results of the comparing the expected installation results with the software trend comparison, to facilitate verification of an installer for the software product development.

8. The software product of claim 7, wherein the operations further comprise tracking expectations of resource changes in a primary installation baseline and a secondary installation baseline, and wherein presenting the potential problems comprises presenting a baseline-update interface by transmitting markup language data.

9. The software product of claim 7, wherein the operations further comprise excluding a set of resources from the generated comparison for the software product development.

10. The software product of claim 7, wherein expectations of resource changes are stored in a relational database indexed by date, platform, language, and product configuration.

11. The software product of claim 7, wherein the attributes comprising modification date stamp information, file size information, security permissions information, and checksum information.

12. The software product of claim 7, wherein the resource comprises a file and a system registry, and the installation data comprises deletion, addition, and modification of the resource.

13. A system comprising:
a build controller;
an install controller comprising a database including a baseline recording expectations of a dynamic attribute and a static attribute for one or more resources associated with a software installer, the dynamic attribute is an attribute that should have changed between a previous software installation and a current software installation, the static attribute is an attribute that should remain unchanged between the previous software installation and the current software installation; and
one or more install slave machines;
wherein the build controller automatically triggers the install controller to initiate installer tests as part of a software build process, and the install controller automatically dispatches installation to the one or more install slave machines and collects test results to be presented in a report comprising a baseline-update interface;
wherein the test results comprise a potential problem with the current software installation identified based on a comparison of the expectations with a software trend comparison that compares an install comparison of the current software installation with an install comparison of the previous software installation in a series of two or more software installations during a software product development to identify whether the dynamic attribute was not changed in the current software installation and whether the static attribute was changed in the current software installation.

14. The system of claim 13, wherein the one or more install slave machines comprise multiple computers.

15. The system of claim 13, wherein the install controller communicates with the one or more install slave machines using Simple Object Access Protocol.

16. The system of claim 13, wherein the baseline-update interface comprises a web-based user interface allowing baseline updates across SKU, language, operating system, and custom/non-custom installs, in combination or all at once.

17. The system of claim 13, wherein the attributes comprising modification date stamp information, file size information, security permissions information, and checksum information.

18. A system comprising:
a user interface device; and
one or more computers operable to interact with the user interface device and to perform operations comprising:
obtaining an install comparison of a current software installation to a target computer and an install comparison of a previous software installation to the same target computer in a series of two or more software installations during a software product development;
generating a software trend comparison of the current software installation install comparison with the previous software installation install comparison;
obtaining expected installation results for a resource including attributes including a dynamic attribute and a static attribute, the dynamic attribute is an attribute that should have changed between the previous software installation and the current software installation, the static attribute is an attribute that should remain unchanged between the previous software installation and the current software installation;
comparing the expected installation results with the software trend comparison to identify whether the dynamic attribute was not changed in the current software installation and whether the static attribute was changed in the current software installation; and
presenting potential problems with the current software installation, based on results of the comparing the expected installation results with the software trend comparison to facilitate verification of an installer for the software product development.

19. The system of claim 18, wherein the operations further comprise tracking expectations for the resource in a primary installation baseline and a secondary installation baseline, and wherein presenting the potential problems comprises presenting a baseline-update interface by transmitting markup language data.

20. The system of claim 18, wherein the operations further comprise excluding a set of resources from the generated comparison for the software product development.

21. The system of claim 19, wherein expectations of resource changes, including the installation data, are stored in a relational database indexed by date, platform, language, and product configuration.

22. The system of claim 18, wherein the attributes comprise modification date stamp information, file size information, security permissions information, and checksum information.

23. The system of claim 18, wherein the resource comprises a file and a system registry, and the installation data comprises deletion, addition, and modification of the resource.

* * * * *

UNITED STATES PATENT AND TRADEMARK OFFICE
CERTIFICATE OF CORRECTION

PATENT NO. : 7,624,394 B1 Page 1 of 1
APPLICATION NO. : 10/716916
DATED : November 24, 2009
INVENTOR(S) : Greg Christopher, Jr.

It is certified that error appears in the above-identified patent and that said Letters Patent is hereby corrected as shown below:

Column 10, line 52, claim 7, after "comparison" delete "target".

Column 12, line 38, claim 18, after "comparison" insert --,--.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,624,394 B1 | Page 1 of 1 |
| APPLICATION NO. | : 10/716916 | |
| DATED | : November 24, 2009 | |
| INVENTOR(S) | : Greg Christopher, Jr. | |

It is certified that error appears in the above-identified patent and that said Letters Patent is hereby corrected as shown below:

On the Title page,

[*] Notice: Subject to any disclaimer, the term of this patent is extended or adjusted under 35 U.S.C. 154(b) by 394 days Delete the phrase "by 394 days" and insert -- by 587 days --

Signed and Sealed this

Thirty-first Day of August, 2010

David J. Kappos
*Director of the United States Patent and Trademark Office*